(12) United States Patent
Xiao (10) Patent No.: US 12,149,786 B2
(45) Date of Patent: Nov. 19, 2024

(54) CABLE MODEM AND METHOD THEREOF, COMPUTER READABLE MEDIUM AND APPARATUS

(71) Applicant: ARRIS Enterprises LLC, Suwanee, GA (US)

(72) Inventor: Jing Xiao, Shenzhen (CN)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 17/340,407

(22) Filed: Jun. 7, 2021

(65) Prior Publication Data
US 2022/0046322 A1 Feb. 10, 2022

(51) Int. Cl.
*H04N 21/45* (2011.01)
*H04N 21/443* (2011.01)

(52) U.S. Cl.
CPC ....... *H04N 21/4508* (2013.01); *H04N 21/443* (2013.01)

(58) Field of Classification Search
CPC .......................... H04N 21/4508; H04N 21/443
See application file for complete search history.

(56) References Cited

U.S. PATENT DOCUMENTS

| | | | | |
|---|---|---|---|---|
| 6,804,262 B1 * | 10/2004 | Vogel | .................... | H04L 25/022 370/480 |
| 8,139,162 B2 * | 3/2012 | Blanchard | .......... | H04N 21/4345 725/38 |
| 8,381,257 B1 * | 2/2013 | Crisp | ............... | H04N 21/42676 725/111 |
| 2002/0100057 A1 | 7/2002 | Brown | | |
| 2005/0076385 A1 * | 4/2005 | Li | .................... | H04N 21/42676 725/111 |

(Continued)

FOREIGN PATENT DOCUMENTS

| CN | 102724088 | 10/2012 |
|---|---|---|
| EP | 1 220 467 | 7/2002 |

OTHER PUBLICATIONS

International Search Report and the Written Opinion of the International Searching Authority dated Sep. 17, 2021 in International (PCT) Application No. PCT/US2021/036141.

(Continued)

*Primary Examiner* — Randy A Flynn
(74) *Attorney, Agent, or Firm* — Wenderoth, Lind & Ponack, L.L.P.

(57) ABSTRACT

A cable modem in communication with a cable modem termination system, configured to perform at least the following: during an operation phase of the cable modem, acquiring and storing damaged channel information indicating a damaged channel among a plurality of channels between the cable modem and the cable modem termination system which is detected during the operation phase; during an initialization phase of the cable modem, adjusting a scanning sequence of the plurality of channels according to the stored damaged channel information so as to cause the damaged channel to have the latest scanning order; and scanning the plurality of channels according to the adjusted scanning sequence to determine, among the plurality of channels, a channel for performing communication between the cable modem and the cable modem termination system.

19 Claims, 3 Drawing Sheets

(56) References Cited

U.S. PATENT DOCUMENTS

2011/0320634 A1* 12/2011 Yang .................. H04L 61/5014
375/222
2014/0269867 A1* 9/2014 Meller .................... H04B 3/46
375/224

OTHER PUBLICATIONS

International Preliminary Report on Patentability dated Feb. 7, 2023 in International (PCT) Application No. PCT/US2021/036141.

* cited by examiner

CABLE MODEM AND METHOD THEREOF, COMPUTER READABLE MEDIUM AND APPARATUS

TECHNICAL FIELD

The present disclosure relates to the field of cable modems, and more particularly, to communications between a cable modem and a cable modem termination system.

BACKGROUND

A cable modem (CM) is a device that can access data through a cable television network. The CM, connected, for example, between a cable socket in a premises and an Internet device (e.g., a computer) in a user's home, demodulates a downstream signal from a cable modem termination system (CMTS) to provide to the Internet device, and modulates an upstream signal from the Internet device and send back to the CMTS.

During an initialization phase of the CM, it is necessary to establish a communication connection with the CMTS. The CM first scans downstream channels from the CMTS to the CM to determine a valid downstream channel. Next, the CM scans upstream channels from the CM to the CMTS to determine a valid upstream channel. Accordingly, the CM establishes a communication connection with the CMTS and the initialization is completed. During an operation phase of the CM, the CM may communicate with the CMTS using the valid upstream and downstream channels.

SUMMARY

During a normal operation phase of the CM, some channels may be damaged due to noise, interference, etc., and not continue to be used for communication with the CMTS. The channel damage may last for some time and remain unrecovered until a next initialization phase of the CM.

If the CM still scans all channels in an original scanning sequence during the initialization phase, it is likely to scan the damaged channels during the determination of the valid downstream/upstream channels. During the CM's scan for a damaged channel, the CM fails to receive feedback signals over the channel due to the inability of the damaged channel to provide communication capability and will continuously wait for a predetermined timeout period so as to determine that the channel has been damaged. The CM will not continue to scan a next channel until the predetermined timeout period has elapsed. Such a scanning mechanism is likely to cause a reduction in the scanning efficiency of the CM and an extension in the initialization time of the CM.

The present disclosure provides a cable modem and a method thereof, a computer readable medium, and an apparatus capable of improving a scanning efficiency of the CM and shortening a initialization time of the CM.

According to one aspect of the present disclosure, there is provided a cable modem in communication with a cable modem termination system, the cable modem comprising: a memory having instructions stored thereon; and a processor configured to execute the instructions stored on the memory to cause the cable modem to perform at least the following: during an operation phase of the cable modem, acquiring and storing damaged channel information indicating a damaged channel among a plurality of channels between the cable modem and the cable modem termination system which is detected during the operation phase; during an initialization phase of the cable modem, adjusting a scanning sequence of the plurality of channels according to the stored damaged channel information so as to cause the damaged channel to have the latest scanning order; and scanning the plurality of channels according to the adjusted scanning sequence to determine, among the plurality of channels, a channel for performing communication between the cable modem and the cable modem termination system.

In some embodiments, the damaged channel information indicates the latest detected damaged channel during the operation phase.

In some embodiments, the damaged channel information indicates a plurality of damaged channels detected during the operation phase, the processor is further configured to execute the instructions stored on the memory to cause the cable modem to perform at least the following: during the initialization phase, adjusting the scanning sequence of the plurality of channels according to the stored damaged channel information so as to cause a later detected damaged channel among the plurality of damaged channels to have a later scanning order.

In some embodiments, the processor is further configured to execute the instructions stored on the memory to cause the cable modem to perform at least the following: during the operation phase, acquiring and storing operational channel information indicating an operational channel that is an undamaged channel among the plurality of channels which is detected during the operation phase; during the initialization phase, adjusting a scanning sequence of the plurality of channels according to the stored operational channel information so as to cause the operational channel to have the earliest scanning order.

In some embodiments, the operational channel information indicates the latest detected operational channel during the operation phase.

In some embodiments, the operational channel information indicates a plurality of operational channels detected during the operation phase, the processor is further configured to execute the instructions stored on the memory to cause the cable modem to perform at least the following: during the initialization phase, adjusting the scanning sequence of the plurality of channels according to the stored operational channel information so as to cause a later detected operational channel among the plurality of operational channels to have an earlier scanning order.

In some embodiments, the processor is further configured to execute the instructions stored on the memory to cause the cable modem to perform at least the following: during the operation phase, updating at least one of the stored damaged channel information and operational channel information, wherein the updating includes at least one of: in a case that a first damaged channel detected during the operation phase does not match any damaged channel indicated by the stored damaged channel information, adding information indicating the first damaged channel to the damaged channel information; in a case that a first operational channel detected during the operation phase does not match any operational channel indicated by the stored operational channel information, adding information indicating the first operational channel to the operational channel information; in a case that a second operational channel detected during the operation phase matches a second damaged channel indicated by the stored damaged channel information, removing information indicating the second damaged channel from the stored damaged channel information; in a case that a third damaged channel detected during the operation phase matches a third operational channel indicated by the stored operational channel information, removing information indicating the third operational channel from the stored operational channel information.

In some embodiments, the processor is further configured to execute the instructions stored on the memory to cause the cable modem to perform at least the following: performing the updating periodically.

In some embodiments, the plurality of channels are a plurality of upstream channels from the cable modem to the cable modem termination system or a plurality of downstream channels from the cable modem termination system to the cable modem.

According to another aspect of the present disclosure, there is provided a method for a cable modem in communication with a cable modem termination system, the method comprising: during an operation phase of the cable modem, acquiring and storing damaged channel information indicating a damaged channel among a plurality of channels between the cable modem and the cable modem termination system which is detected during the operation phase; during an initialization phase of the cable modem, adjusting a scanning sequence of the plurality of channels according to the stored damaged channel information so as to cause the damaged channel to have the latest scanning order; and scanning the plurality of channels according to the adjusted scanning sequence to determine, among the plurality of channels, a channel for performing communication between the cable modem and the cable modem termination system.

In some embodiments, the damaged channel information indicates a plurality of damaged channels detected during the operation phase, among the plurality of damaged channels, a later detected damaged channel has a later scanning order.

In some embodiments, the method further comprises: during the operation phase, acquiring and storing operational channel information indicating an operational channel that is an undamaged channel among the plurality of channels which is detected during the operation phase; during the initialization phase, adjusting a scanning sequence of the plurality of channels according to the stored operational channel information so as to cause the operational channel to have the earliest scanning order.

In some embodiments, the operational channel information indicates a plurality of operational channels detected during the operation phase, among the plurality of operational channels, a later detected operational channel has an earlier scanning order.

In some embodiments, the method further comprises: during the operation phase, updating at least one of the stored damaged channel information and operational channel information, wherein the updating includes at least one of: in a case that a first damaged channel detected during the operation phase does not match any damaged channel indicated by the stored damaged channel information, adding information indicating the first damaged channel to the damaged channel information; in a case that a first operational channel detected during the operation phase does not match any operational channel indicated by the stored operational channel information, adding information indicating the first operational channel to the operational channel information; in a case that a second operational channel detected during the operation phase matches a second damaged channel indicated by the stored damaged channel information, removing information indicating the second damaged channel from the stored damaged channel information; in a case that a third damaged channel detected during the operation phase matches a third operational channel indicated by the stored operational channel information, removing information indicating the third operational channel from the stored operational channel information.

According to yet another aspect of the disclosure, there is provided a non-transitory computer readable medium for use with a processor, the non-transitory computer readable medium having stored thereon instructions that, when executed by the processor, perform at least the following: during an operation phase of a cable modem, acquiring and storing damaged channel information indicating a damaged channel among a plurality of channels between the cable modem and the cable modem termination system which is detected during the operation phase; during an initialization phase of the cable modem, adjusting a scanning sequence of the plurality of channels according to the stored damaged channel information so as to cause the damaged channel to have the latest scanning order; and scanning the plurality of channels according to the adjusted scanning sequence to determine, among the plurality of channels, a channel for performing communication between the cable modem and a cable modem termination system.

In some embodiments, the damaged channel information indicates a plurality of damaged channels detected during the operation phase, the instructions, when executed by the processor, further perform at least the following: during the initialization phase, adjusting the scanning sequence of the plurality of channels according to the stored damaged channel information so as to cause a later detected damaged channel among the plurality of damaged channels to have a later scanning order.

In some embodiments, the instructions, when executed by the processor, further perform at least the following: during the operation phase, acquiring and storing operational channel information indicating an operational channel that is an undamaged channel among the plurality of channels which is detected during the operation phase; during the initialization phase, adjusting a scanning sequence of the plurality of channels according to the stored operational channel information so as to cause the operational channel to have the earliest scanning order.

In some embodiments, the operational channel information indicates a plurality of operational channels detected during the operation phase, the instructions, when executed by the processor, further perform at least the following: during the initialization phase, adjusting the scanning sequence of the plurality of channels according to the stored operational channel information so as to cause a later detected operational channel among the plurality of operational channels to have an earlier scanning order.

In some embodiments, the instructions, when executed by the processor, further perform at least the following: during the operation phase, updating at least one of the stored damaged channel information and operational channel information, wherein the updating includes at least one of: in a case that a first damaged channel detected during the operation phase does not match any damaged channel indicated by the stored damaged channel information, adding information indicating the first damaged channel to the damaged channel information; in a case that a first operational channel detected during the operation phase does not match any operational channel indicated by the stored operational channel information, adding information indicating the first operational channel to the operational channel information; in a case that a second operational channel detected during the operation phase matches a second damaged channel indicated by the stored damaged channel information, removing information indicating the second damaged channel from the stored damaged channel information; in a case that a third damaged channel detected during the operation phase matches a third operational channel indicated by the stored operational channel information, removing information indicating the third operational channel from the stored operational channel information.

According to yet another aspect of the present disclosure, there is provided an apparatus comprising means for performing a method according to embodiments of the present disclosure.

BRIEF DESCRIPTION OF THE DRAWINGS

To better understand the present disclosure and to show how to implement the present disclosure, reference will now be made, by way of example, to the accompanying drawings, in which.

Note that like reference numerals refer to corresponding parts throughout the drawings.

DETAILED DESCRIPTION

The following detailed description is made with reference to the accompanying drawings and is provided to assist in a comprehensive understanding of various exemplary embodiments of the disclosure. The following description includes various details to aid understanding, but these details are to be regarded as examples only and are not intended to limit the disclosure, which is defined by the appended claims and their equivalents. The words and phrases used in the following description are intended only to provide a clear and consistent understanding of the disclosure. In addition, descriptions of well-known structures, functions, and configurations may be omitted for clarity and conciseness. Those of ordinary skill in the art will recognize that various changes and modifications of the examples described herein can be made without departing from the spirit and scope of the disclosure.

Figure 1:
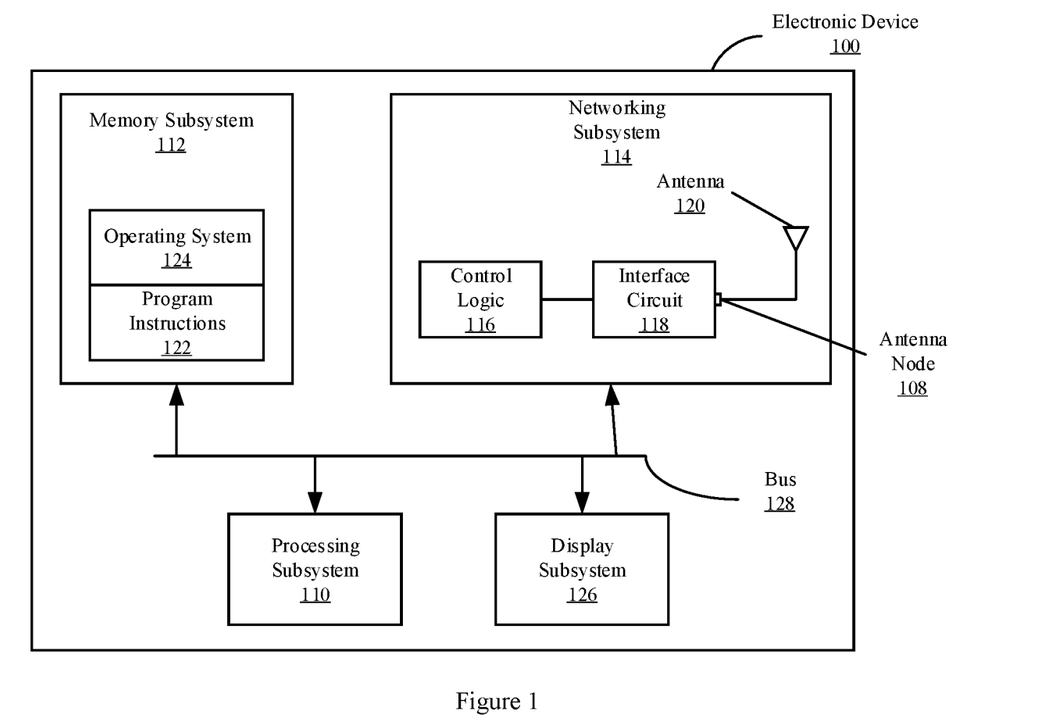
FIG. 1 illustrates an exemplary configuration of an electronic device which can implement embodiments according to the present disclosure.

FIG. 1 illustrates an exemplary configuration block diagram of an electronic device 100 that can implement embodiments according to the present disclosure. For example, the electronic device 100 may be used to implement a method 200 and/or method 300 according to embodiments of the present disclosure, which will be described later.

As shown in FIG. 1, the electronic device 100 includes a processing subsystem 110, a memory subsystem 112, and a networking subsystem 114.

Figure 2:
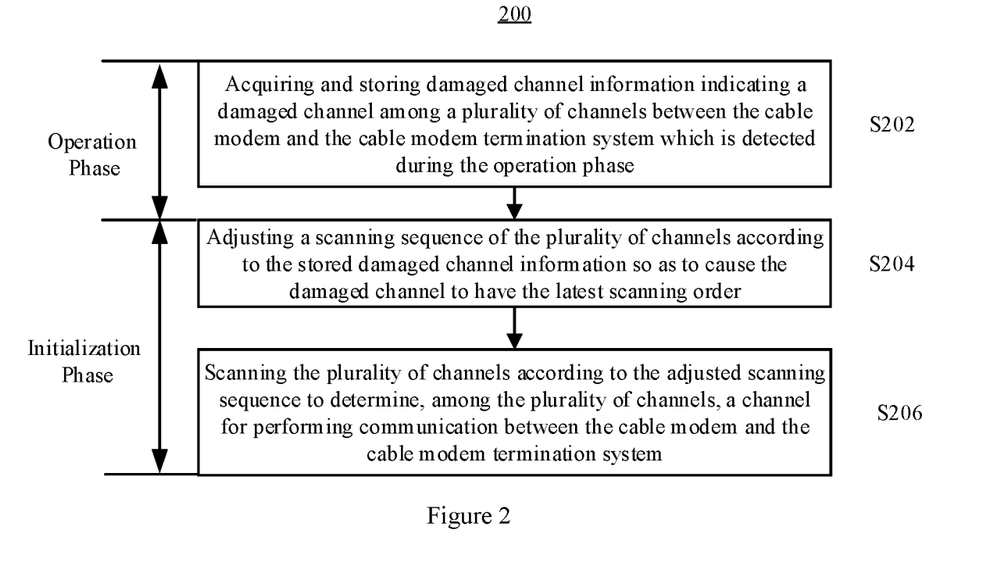
FIG. 2 illustrates an exemplary flow diagram of a method for a CM in accordance with an embodiment of the present disclosure.
Figure 3:
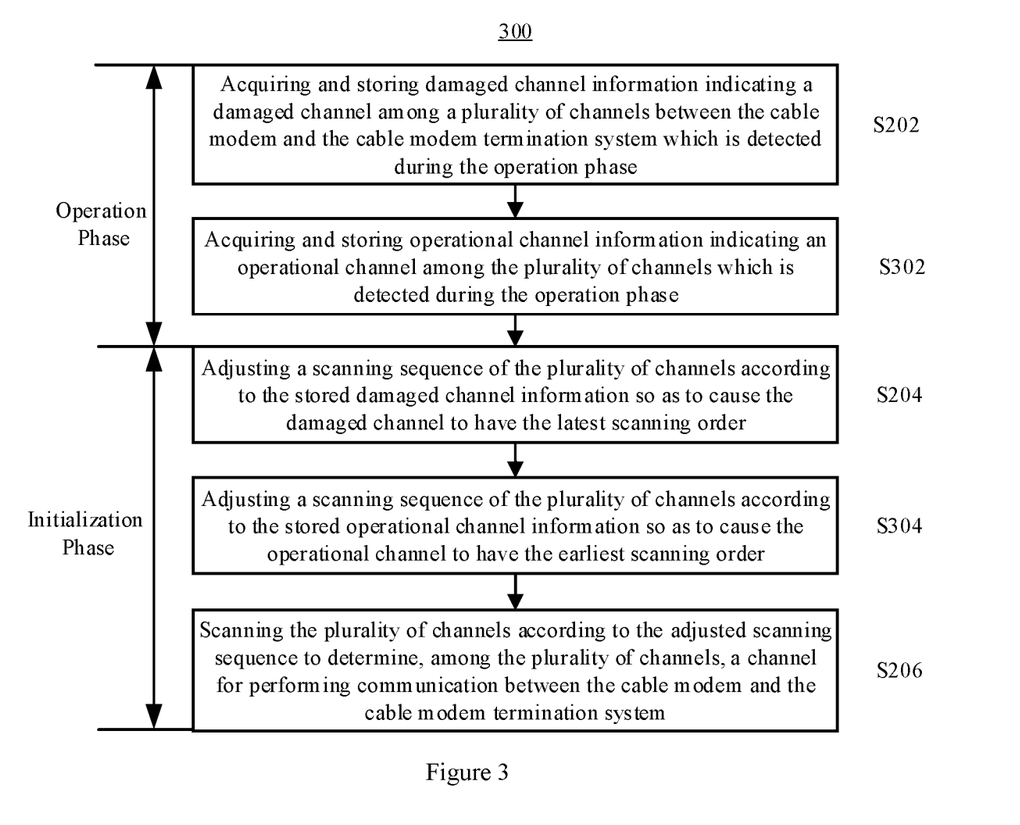
FIG. 3 illustrates an exemplary flow diagram of a method for a CM in accordance with another embodiment of the present disclosure.

Processing subsystem 110 may be configured to execute instructions stored on memory subsystem 112 to implement steps in the method 200 and/or method 300 which will be described later. Processing subsystem 110 may include one or more devices configured to perform computing operations. For example, processing subsystem 110 may include one or more microprocessors, an ASIC, a microcontroller, a programmable logic device, a Graphics Processor Unit (GPU), and/or one or more Digital Signal Processors (DSPs).

Memory subsystem 112 includes one or more devices for storing data and/or instructions for processing subsystem 110 and networking subsystem 114. For example, memory subsystem 112 may include Dynamic Random Access Memory (DRAM), Static Random Access Memory (SRAM), and/or other types of memory (sometimes collectively or individually referred to as "computer-readable storage media").

Additionally, memory subsystem 112 may include mechanisms for controlling access to memory. In some embodiments, memory subsystem 112 includes a memory hierarchy that includes one or more caches coupled to memory in electronic device 100. In some of these embodiments, one or more of the caches are located in processing subsystem 110.

In some embodiments, memory subsystem 112 is coupled to one or more high capacity mass storage devices (not shown). For example, the memory subsystem 112 may be coupled to a magnetic or optical drive, a solid state drive, or another type of mass storage device. In these embodiments, electronic device 100 may use memory subsystem 112 as a fast-access storage for frequently used data, while mass storage devices are used to store infrequently used data.

Networking subsystem 114 includes one or more devices configured to couple to and communicate over a wired and/or wireless network (i.e., to perform network operations), including: control logic 116, interface circuitry 118, and one or more antennas 120 (or antenna elements). Although FIG. 1 includes one or more antennas 120, in some embodiments, electronic device 100 includes one or more nodes, such as node 108, e.g., a pad, that may be coupled to one or more antennas 120. Accordingly, electronic device 100 may or may not include one or more antennas 120. For example, the networking subsystem 114 may include a Bluetooth networking system, a cellular networking system (e.g., a 3G/4G/5G network such as UMTS, LTE, etc.), a USB networking system, a networking system based on standards described in IEEE 802.11 (e.g., a Wi-Fi networking system), an Ethernet networking system, and/or another networking system.

Within electronic device 100, processing subsystem 110, memory subsystem 112, and networking subsystem 114 are coupled together using bus 128. Bus 128 may include electrical, optical, and/or electro-optical connections that the subsystems may use to communicate commands, data, and the like. Although only one bus 128 is shown for clarity, different embodiments may include different numbers or configurations of electrical, optical, and/or electro-optical connections among the subsystems.

In some embodiments, electronic device 100 includes a display subsystem 126 for displaying information on a display, which may include a display driver and a display, such as a liquid crystal display, multi-touch screen, or the like.

Electronic device 100 may be (or may be included in) any electronic device having at least one network interface. For example, electronic device 100 may be (or may be included in): a desktop computer, a laptop computer, a sub-notebook/netbook, a server, a computer, a mainframe computer, a cloud-based computer, a tablet computer, a smartphone, a cellular phone, a smart watch, a wearable device, a consumer electronics device, a portable computing device, an access point, a transceiver, a controller, a radio node, a cable modem (e.g., the cable modem of the present disclosure), a router, a switch, a communication device, an access point, a test device, and/or other electronic devices.

Furthermore, any combination of analog and/or digital circuits may be used to implement circuits and components in the electronic device 100, including: bipolar, PMOS and/or NMOS gates or transistors. Further, signals in these embodiments may include digital signals having approximately discrete values and/or analog signals having continuous values. In addition, the components and circuits may be single ended or differential, and the power supply may be unipolar or bipolar.

Although some operations in the aforementioned embodiments are implemented in hardware or software, in general, the operations in the aforementioned embodiments may be implemented in a variety of configurations and architectures. Accordingly, some or all of the operations in the aforementioned embodiments may be performed in hardware, software, or both. For example, at least some operations in the communication techniques may be implemented using program instructions 122, an operating system 124 (such as a driver for the interface circuit 118), or in firmware in the interface circuit 118. Alternatively or additionally, at least some operations in the communication techniques may be implemented in hardware in a physical layer, such as the interface circuit 118.

FIG. 2 illustrates a flow diagram of a method 200 for a CM in accordance with an embodiment of the present disclosure. The method 200 may be implemented, for example, by the electronic device 100 described in FIG. 1, wherein the steps of the method 200 may be performed, for example, by the processing subsystem 110 of the electronic device 100.

As shown in FIG. 2, the method 200 comprises steps S202, S204, and S206, where step S202 is performed during an operation phase of the CM, and steps S204 and S206 are performed during an initialization phase of the CM.

The initialization phase of the CM described in the present disclosure may refer to an initialization, re-initialization, restart, reconfiguration, bringing up, etc. of the CM. The initialization phase of the CM may be triggered by a user (for example, by a user pressing a reset button on the CM) or may be performed under the control of the CMTS. During the initialization phase of the CM, downstream/upstream channels are scanned to determine a valid downstream/upstream channel (sometimes also referred to as a primary upstream/downstream channel).

It should be appreciated that the process of scanning the upstream channels of the CM to determine a valid upstream channel is sometimes also referred to as "ranging". In the present disclosure, the aforementioned process is also referred to as a scanning process for the sake of brevity. In addition, a description of other operations of the initialization phase is omitted from the present disclosure, and only an operation of scanning channels to determine a valid channel is described.

The operation phase of the CM described in the present disclosure refers to a phase of data transmission between the CM and the CMTS over the valid upstream/downstream channel determined during the initialization phase of the CM, after the initialization of the CM is completed. Typically, the initialization phase and the operation phase of the CM are alternately performed, and the CM enters the operation phase after the initialization is completed, and enters the initialization phase in response to a trigger by the user or the control of the CMTS, etc. during the operation phase.

The method 200 according to an embodiment of the present disclosure may be applied to an adjustment of a scanning sequence of the upstream channels and/or the downstream channels. Hereinafter, taking the downstream channels as an example, the flow of the method 200 according to an embodiment of the present disclosure will be described.

As shown in FIG. 2, in step S202, during an operation phase of the CM, damaged channel information is acquired and stored. The damaged channel information indicates a damaged channel among a plurality of channels between the CM and the CMTS which is detected during the operation phase.

In the present disclosure, the damaged channel refers to a channel that becomes unavailable due to noise, interference, etc. In contrast, an operational channel refers to a channel that is undamaged and can be normally used.

In some embodiments, the damaged channel information may be acquired by using existing mechanisms in the operation phase of the CM. Specifically, during the operation phase of the CM, the CM detects in real time states of all the downstream channels (e.g., frequency points in a frequency range of 108 MHz to 1018 MHz) which have been locked by the CM, in order to determine which channel can be used for data communication with the CMTS. For example, when a CM detects that the strength of a signal on a certain downstream channel is too weak or there is no signal on the certain downstream channel, then the channel is determined as a damaged channel and will not be used for communication with the CMTS; and when the CM detects that the strength of a signal on a certain channel is within a predetermined threshold range and communication information may be normally received/sent on the channel, the channel is determined as an operational channel for communication with the CMTS. In addition, the CM will similarly detect states of all the upstream channels.

The above detection mechanisms of the CM may be utilized by checking the detection result to acquire the damaged channel information (e.g., indicating that a channel corresponding to the frequency point 1016 MHz is a damaged channel).

In some embodiments, the damaged channel information may be stored in a memory (e.g., the memory subsystem 112 of FIG. 1) of the CM for operation in a next initialization phase of the CM.

Next, in step S204, during the initialization phase of the CM, the scanning sequence of the plurality of channels is adjusted according to the stored damaged channel information so as to cause the damaged channel to have a latest scanning order.

Table 1 below illustrates the scanning sequence of the downstream channels before adjustment and the scanning sequence after the adjustment in step S204. Since the damaged channel information indicates that the channel corresponding to the frequency point 1016 MHz is a damaged channel, the scanning order of the channel corresponding to 1016 MHz is adjusted from the original third one to the latest one.

TABLE 1

| Before Adjustment | 1018 MHz, 1017 MHz, 1016 MHz, 1015 MHz, . . . , 109 MHz, 108 MHz |
|---|---|
| After Adjustment | 1018 MHz, 1017 MHz, 1015 MHz, . . . , 109 MHz, 108 MHz, 1016 MHz |

Next, in step S206, the plurality of channels are scanned according to the adjusted scanning sequence to determine a channel for communication between the CM and the CMTS among the plurality of channels.

In the aforementioned example, the downstream channels are scanned according to the adjusted scanning sequence in Table 1 until a valid downstream channel is determined for downstream communication between the CM and the CMTS. In some embodiments, in a case that the strength of a downstream signal received from a certain downstream channel is within a predetermined threshold range and communication information may be normally received/sent on the channel, the CM determines the downstream channel (e.g., the channel corresponding to the frequency point 1015 MHz) as a valid downstream channel.

In a case that the scanning is performed according to the adjusted scanning sequence in Table 1, the valid channel 1015 MHz may be determined by performing three times of scanning (that is, sequentially scanning for 1018 MHz, 1017 MHz, 1015 MHz). In contrast, if the scanning is performed with the scanning sequence before the adjustment, the CM will scan the damaged channel 1016 MHz and waits for a predetermined timeout period before scanning 1015 MHz and determining it as a valid channel.

It should be understood that Table 1 above illustrates a case where the scanning sequence of the damaged channel is adjusted for all the downstream channels (e.g., all the frequency points in the frequency range from 108 MHz to 1018 MHz), however, the present disclosure is not limited thereto, and the scanning sequence of the damaged channel may be adjusted to be the latest for only a portion of all the downstream channels. In addition, although the scanning sequence before adjustment illustrated in Table 1 is in a sequence from a high frequency to a low frequency, the method of the present disclosure can be applied to the adjustment of other scanning sequence.

The method 200 according to the embodiment of the present disclosure can improve the scanning efficiency of the CM and shorten the time for the initialization of the CM.

The scanning process for the upstream channels is similar to that for the downstream channels. The CM adjusts a scanning sequence of a plurality of upstream channels (e.g., a plurality of candidate upstream channels determined by the CMTS) based on the acquired and stored damaged channel information to cause the damaged upstream channel to have the latest scanning order, and scans the plurality of upstream channels according to the adjusted scanning sequence until a valid upstream channel is determined.

In the scanning process of the upstream channels, the timeout period that needs to wait when a damaged channel is scanned (for example, it is needed to wait for timeout periods of 16 handshake signals) is longer than that in the case of the downstream channels. Therefore, with the method 200 according to the present disclosure, the upstream scanning efficiency of the CM can be improved more significantly, and the time for the initialization of the CM can be shortened.

In some embodiments, the damaged channel information may indicate the latest detected damaged channel during the operation phase of the CM, namely the most recently detected damaged channel before a next initialization phase. According to this embodiment, during the initialization phase of the CM, it is more likely that the latest detected damage during the operation phase is unrecovered, and therefore, by causing the damaged channel to have the latest scanning order, the scanning efficiency of the CM can be further improved.

In some embodiments, the damaged channel information may indicate a plurality of damaged channels detected during the operation phase of the CM.

For example, the damaged channel information may be stored in form of a table in a memory (e.g., the memory subsystem 112 in FIG. 1) of the CM. Table 2 below illustrates the damaged channel information in form of a table, indicating four downstream damaged channels.

TABLE 2

| Damaged Channel | |
|---|---|
| | 1016 MHz |
| | 1000 MHz |
| | 500 MHz |
| | 300 MHz |

In some embodiments, the scanning orders of the plurality of damaged channels may be adjusted to be the latest, i.e., later than or after the undamaged channels. In some embodiments, a later detected damaged channel has a later scanning order among the plurality of damaged channels. For example, among the four damaged channels shown in Table 2, 1016 MHz is the latest detected (namely the most recently detected before a next initialization phase), and its scanning order may be adjusted to be the latest. Since a later detected damaged channel is more likely to be unrecovered, in this way the scanning frequency of the CM can be further improved.

Next, an exemplary flow diagram of a method 300 for a CM according to another embodiment of the present disclosure is described with reference to FIG. 3. In the method 300, steps S202 to S206 are the same as those in the method 200 described with reference to FIG. 2, so the same reference numerals are attached and the description thereof is omitted. Hereinafter, only steps S302 and S304 which are different from the method 200 in FIG. 2 will be described.

As shown in FIG. 3, in some embodiments, in the operation phase of the CM, in addition to acquiring and storing damage information, an operational channel information may be acquired and stored in step S302. The operational channel information indicates an operational channel that is an undamaged channel among a plurality of channels between the CM and the CMTS which is detected during the operation phase.

As already described above, the CM detects, in real time, the states of all the channels during the operation phase to determine which channels are damaged channels and which channels are operational channels. In some embodiments, this mechanism in the operation phase of the CM may be utilized to acquire the operational channel information (e.g., indicating that a channel corresponding to frequency point 1015 MHz is an operational channel).

In some embodiments, the operational channel information may be stored in a memory (e.g., the memory subsystem 112 of FIG. 1) of the CM for operation of a next initialization phase of the CM.

Next, in step S304, during the initialization phase of the CM, the scanning sequence of the plurality of channels is adjusted according to the stored operational channel information so as to cause the operational channel to have an earliest scanning order.

Table 3 below illustrates the scanning sequence of the downstream channels before adjustment, the scanning sequence after the adjustment according to the damaged channel information in step S204, and the scanning sequence after further adjustment according to the operational channel information in step S304.

TABLE 3

| | |
|---|---|
| Before Adjustment | 1018 MHz, 1017 MHz, 1016 MHz, 1015 MHz, . . . , 109 MHz, 108 MHz |
| After Adjustment According to Damaged Channel Information | 1018 MHz, 1017 MHz, 1015 MHz, . . . , 109 MHz, 108 MHz, 1016 MHz |
| After Further Adjustment According to Operational Channel Information | 1015 MHz, 1018 MHz, 1017 MHz, . . . , 109 MHz, 108 MHz, 1016 MHz |

In the scanning sequence after further adjustment according to the operational channel information, since the operational channel information indicates that the channel corresponding to frequency point 1015 MHz is an operational channel, the scanning order of the channel corresponding to 1015 MHz is adjusted to be the earliest.

Accordingly, when the plurality of channels are scanned according to the scanning sequence after adjustment in step S206, the channel corresponding to 1015 MHz will be scanned first. Since the channel is an operational channel, the channel can be directly determined as a valid downstream channel through one time of scanning without performing any subsequent scanning operation.

Therefore, the method 300 according to the embodiment of the present disclosure can further improve the scanning efficiency.

The method 300 has been introduced above by taking the downstream scanning as an example. The scanning process for the upstream channels is similar to that for the downstream channels. The CM may adjust the scanning sequence of the plurality of upstream channels according to the acquired and stored operational channel information so as to cause the upstream operational channel to have the earliest scanning order, and scan the plurality of upstream channels according to the adjusted scanning sequence until a valid upstream channel is determined.

In addition, in the method 300 shown in FIG. 3, a case is illustrated in which step S302 is performed after step S202 and step S304 is performed after step S204. However, the implementation of the method 300 is not limited thereto, for example, step S302 may alternatively be performed before step S202 or in parallel with step S202, and step S304 may alternatively be performed before step S204 or in parallel with step S204.

In some embodiments, the operational channel information may indicate the latest detected operational channel during the operation phase of the CM, namely the most recently detected operational channel before a next initialization phase. According to this embodiment, during the initialization phase of the CM, it is more likely that the latest detected operational channel during the operation phase is still available, and therefore, by causing the operational channel to have the earliest scanning order, the scanning efficiency of the CM can be further improved.

In some embodiments, the operational channel information may indicate a plurality of operational channels detected during the operation phase of the CM.

For example, the operational channel information may be stored in form of a table in a memory (e.g., the memory subsystem 112 in FIG. 1) of the CM. Table 4 below illustrates the operational channel information in form of a table, indicating four downstream operational channels.

TABLE 4

| | |
|---|---|
| Operational Channel | 1015 MHz |
| | 800 MHz |
| | 600 MHz |
| | 400 MHz |

In some embodiments, the scanning orders of the plurality of operational channels may be adjusted to be the earliest. In some embodiments, a later detected operational channel has an earlier scanning order among the plurality of operational channels. For example, among the four operational channels shown in Table 4, 1015 MHz is the latest detected (namely the most recently detected before a next initialization phase), and its scanning order may be adjusted to be the earliest. Since a later detected operational channel is more likely to be still available, in this way the scanning frequency of the CM can be further improved.

In some embodiments, during the operation phase of the CM, the stored damaged channel information and/or operational channel information may be further updated.

In some embodiments, in a case that a damaged channel detected during the operation phase of the CM does not match any damaged channel indicated by the stored damaged channel information, information indicating the detected damaged channel may be added to the damaged channel information.

Taking Table 2 above as an example, in a case that it is detected during the operation phase of the CM that the channel corresponding to frequency point 850 MHz is a damaged channel, since 850 MHz has not been stored in the damaged channel information shown in Table 2, 850 MHz may be added to Table 2.

In some embodiments, in a case that an operational channel detected during the operation phase of the CM does not match any operational channel indicated by the stored operational channel information, information indicating the detected operational channel may be added to the operational channel information.

Taking Table 4 above as an example, in a case that it is detected during the operation phase of the CM that the channel corresponding to frequency point 950 MHz is an operational channel, since 950 MHz has not been stored in the operational channel information shown in Table 4, 950 MHz may be added to Table 4.

In some embodiments, in a case that one or more operational channels detected during the operation phase of the CM match one or more damaged channels indicated by the stored damaged channel information, information indicating the one or more damaged channels may be removed from the stored damaged channel information.

Taking the above Tables 2 and 4 as an example, in a case that it is detected during the operation phase of the CM that the channel corresponding to frequency point 1000 MHz is an operational channel, it indicates that the frequency point 1000 MHz has changed from a damaged channel to an operational channel, and thus the frequency point 1000 MHz may be deleted from Table 2. In addition, the frequency point 1000 MHz may be added to Table 4 to update the operational channel information in Table 4.

In some embodiments, in a case that one or more damaged channels detected during the operation phase of the CM match one or more operational channels indicated by the stored operational channel information, information indicating the one or more operational channels may be removed from the stored operational channel information.

Taking Tables 2 and 4 above as examples, in a case that it is detected during the operation phase of the CM that the channel corresponding to the frequency point 800 MHz is a damaged channel, it indicates that the frequency point 800 MHz has changed from an operational channel to a damaged channel, and thus the frequency point 800 MHz may be deleted from Table 4. In addition, frequency point 800 MHz may be added to Table 2 to update the damaged channel information in Table 2.

According to one or more of the aforementioned updating operations, the damaged channel information and/or the operational channel information can be dynamically updated according to a change in the channel states.

In some embodiments, the aforementioned updating operations may be performed periodically (e.g., one updating operation per minute or minutes). For example, the state of each channel detected by the CM may be periodically checked to periodically acquire and update the damaged channel information and/or the operational channel information. Thereby, the damaged channel information and/or operational channel information can be automatically maintained to match the current actual channel states.

The present disclosure may be implemented as any combination of devices, systems, integrated circuits, and computer programs on non-transitory computer readable media. One or more processors may be implemented as an Integrated Circuit (IC), an Application Specific Integrated Circuit (ASIC), or a large scale integrated circuit (LSI), a system LSI, an ultra LSI, or an ultra LSI package that performs some or all of the functionalities described in this disclosure.

The present disclosure includes the use of software, applications, computer programs, or algorithms. Software, applications, computer programs, or algorithms may be stored on a non-transitory computer readable medium to cause a computer, such as one or more processors, to perform the steps described above and depicted in the figures. For example, the one or more memories store software or algorithms in executable instructions and the one or more processors may associate a set of instructions to execute the software or algorithms to provide bridge functionality for a router according to embodiments described in the present disclosure.

Software and computer programs (which may also be referred to as programs, software applications, components, or code) include machine instructions for a programmable processor, and may be implemented in a high-level procedural, object-oriented, functional, logical, or assembly or machine language. The term "computer-readable medium" refers to any computer program product, apparatus or device, such as magnetic disks, optical disks, solid-state storage devices, memories, and Programmable Logic Devices (PLDs), used to provide machine instructions or data to a programmable data processor, including a computer-readable medium that receives machine instructions as a computer-readable signal.

By way of example, computer-readable media may comprise Dynamic Random Access Memory (DRAM), Random Access Memory (RAM), Read Only Memory (ROM), electrically erasable read only memory (EEPROM), compact disk read only memory (CD-ROM) or other optical disk storage, magnetic disk storage or other magnetic storage devices, or any other medium which may be used to carry or store desired computer-readable program code in the form of instructions or data structures and which may be accessed by a general-purpose or special-purpose computer or a general-purpose or special-purpose processor. Disk and disc, as used herein, includes Compact Disc (CD), laser disc, optical disc, Digital Versatile Disc (DVD), floppy disk and blu-ray disc where disks usually reproduce data magnetically, while discs reproduce data optically with lasers. Combinations of the above are also included within the scope of computer-readable media.

The subject matter of the present disclosure is provided as examples of apparatus, systems, methods, and programs for performing the features described in the present disclosure. However, other features or variations are contemplated in addition to the above-described features. It is contemplated that the implementation of the components and functions of the present disclosure may be accomplished with any emerging technology that may replace the technology of any of the implementations described above.

Additionally, the above description provides examples, and does not limit the scope, applicability, or configuration set forth in the claims. Changes may be made in the function and arrangement of elements discussed without departing from the spirit and scope of the disclosure. Various embodiments may omit, substitute, or add various procedures or components as appropriate. For example, features described with respect to certain embodiments may be combined in other embodiments.

Further, in the description of the present disclosure, the terms "first", "second", "third", and the like are used for descriptive purposes only and are not to be construed as indicating or suggesting a relative importance or order.

Similarly, while operations are depicted in the drawings in a particular order, this should not be understood as requiring that such operations be performed in the particular order shown or in sequential order, or that all illustrated operations be performed, to achieve desirable results. In some cases, multitasking and parallel processing may be advantageous.

I claim:

1. A cable modem in communication with a cable modem termination system (CMTS), the cable modem comprising:
a memory having instructions stored thereon; and
a processor configured to execute the instructions stored on the memory to cause the cable modem to perform at least the following:
during an operation phase of the cable modem that includes data transmission between the cable modem and the CMTS, detecting in real time a state of a plurality of channels locked by the cable modem, wherein the operation phase is a phase of data transmission between the cable modem and the CMTS over a valid channel determined during an initialization phase of the cable modem after the initialization of the cable modem is completed, wherein the state indicates damaged or operational, and wherein the initialization phase is triggered by a user or performed under control by the CMTS;
acquiring and storing damaged channel information indicating a damaged channel among the plurality of channels between the cable modem and the CMTS based on the state of the plurality of channels;
during the initialization phase of the cable modem that includes establishing a communication connection with the CMTS,
adjusting a scanning sequence of the plurality of channels according to the stored damaged channel information so as to cause the damaged channel to have the latest scanning order; and
scanning the plurality of channels according to the adjusted scanning sequence to determine, among the plurality of channels, a channel for performing communication between the cable modem and the cable modem termination system.

2. The cable modem according to claim 1, wherein the damaged channel information indicates the latest detected damaged channel during the operation phase.

3. The cable modem according to claim 1, wherein the damaged channel information indicates a plurality of damaged channels detected during the operation phase,
the processor is further configured to execute the instructions stored on the memory to cause the cable modem to perform at least the following:
during the initialization phase, adjusting the scanning sequence of the plurality of channels according to the stored damaged channel information so as to cause a later detected damaged channel among the plurality of damaged channels to have a later scanning order.

4. The cable modem according to claim 1, wherein the plurality of channels are a plurality of upstream channels from the cable modem to the cable modem termination system or a plurality of downstream channels from the cable modem termination system to the cable modem.

5. The cable modem according to claim 1, wherein the processor is further configured to execute the instructions stored on the memory to cause the cable modem to perform at least the following:
during the operation phase, acquiring and storing operational channel information indicating an operational channel that is an undamaged channel among the plurality of channels which is detected during the operation phase;
during the initialization phase, adjusting a scanning sequence of the plurality of channels according to the stored operational channel information so as to cause the operational channel to have the earliest scanning order.

6. The cable modem according to claim 5, wherein the operational channel information indicates the latest detected operational channel during the operation phase.

7. The cable modem according to claim 5, wherein the operational channel information indicates a plurality of operational channels detected during the operation phase,
the processor is further configured to execute the instructions stored on the memory to cause the cable modem to perform at least the following:
during the initialization phase, adjusting the scanning sequence of the plurality of channels according to the stored operational channel information so as to cause a later detected operational channel among the plurality of operational channels to have an earlier scanning order.

8. The cable modem according to claim 5, wherein the processor is further configured to execute the instructions stored on the memory to cause the cable modem to perform at least the following:
during the operation phase, updating at least one of the stored damaged channel information and operational channel information,
wherein the updating includes at least one of:
in a case that a first damaged channel detected during the operation phase does not match any damaged channel indicated by the stored damaged channel information, adding information indicating the first damaged channel to the damaged channel information;
in a case that a first operational channel detected during the operation phase does not match any operational channel indicated by the stored operational channel information, adding information indicating the first operational channel to the operational channel information;
in a case that a second operational channel detected during the operation phase matches a second damaged channel indicated by the stored damaged channel information, removing information indicating the second damaged channel from the stored damaged channel information;
in a case that a third damaged channel detected during the operation phase matches a third operational channel indicated by the stored operational channel information, removing information indicating the third operational channel from the stored operational channel information.

9. The cable modem according to claim 8, wherein the processor is further configured to execute the instructions stored on the memory to cause the cable modem to perform at least the following:
performing the updating periodically.

10. A method for a cable modem in communication with a cable modem termination system (CMTS), the method comprising:
during an operation phase of the cable modem that includes data transmission between the cable modem and the CMTS, detecting in real time a state of a plurality of channels locked by the cable modem, wherein the operation phase is a phase of data transmission between the cable modem and the CMTS over a valid channel determined during an initialization phase of the cable modem after the initialization of the cable modem is completed, wherein the state indicates damaged or operational, and wherein the initialization phase is triggered by a user or performed under control by the CMTS;
acquiring and storing damaged channel information indicating a damaged channel among the plurality of channels between the cable modem and the CMTS based on the state of the plurality of channels;
during an initialization phase of the cable modem that includes establishing a communication connection with the CMTS,
adjusting a scanning sequence of the plurality of channels according to the stored damaged channel information so as to cause the damaged channel to have the latest scanning order; and
scanning the plurality of channels according to the adjusted scanning sequence to determine, among the plurality of channels, a channel for performing communication between the cable modem and the cable modem termination system.

11. The method according to claim 10, wherein the damaged channel information indicates a plurality of damaged channels detected during the operation phase, among the plurality of damaged channels, a later detected damaged channel has a later scanning order.

12. The method according to claim 10, further comprising:
during the operation phase, acquiring and storing operational channel information indicating an operational channel that is an undamaged channel among the plurality of channels which is detected during the operation phase;

during the initialization phase, adjusting a scanning sequence of the plurality of channels according to the stored operational channel information so as to cause the operational channel to have the earliest scanning order.

13. The method according to claim 10, wherein
the operational channel information indicates a plurality of operational channels detected during the operation phase,
among the plurality of operational channels, a later detected operational channel has an earlier scanning order.

14. The method according to claim 10, further comprising:
during the operation phase, updating at least one of the stored damaged channel information and operational channel information,
wherein the updating includes at least one of:
in a case that a first damaged channel detected during the operation phase does not match any damaged channel indicated by the stored damaged channel information, adding information indicating the first damaged channel to the damaged channel information;
in a case that a first operational channel detected during the operation phase does not match any operational channel indicated by the stored operational channel information, adding information indicating the first operational channel to the operational channel information;
in a case that a second operational channel detected during the operation phase matches a second damaged channel indicated by the stored damaged channel information, removing information indicating the second damaged channel from the stored damaged channel information;
in a case that a third damaged channel detected during the operation phase matches a third operational channel indicated by the stored operational channel information, removing information indicating the third operational channel from the stored operational channel information.

15. A non-transitory computer readable medium for use with a processor, the non-transitory computer readable medium having stored thereon instructions that, when executed by the processor, perform at least the following:
during an operation phase of a cable modem that includes data transmission between the cable modem and a cable modem termination system (CMTS), detecting in real time a state of a plurality of channels locked by the cable modem, wherein the operation phase is a phase of data transmission between the cable modem and the CMTS over a valid channel determined during an initialization phase of the cable modem after the initialization of the cable modem is completed, wherein the state indicates damaged or operational, and wherein the initialization phase is triggered by a user or performed under control by the CMTS;
acquiring and storing damaged channel information indicating a damaged channel among the plurality of channels between the cable modem and the cable modem termination system based on the state of the plurality of channels;
during the initialization phase of the cable modem that includes establishing a communication connection with the CMTS,
adjusting a scanning sequence of the plurality of channels according to the stored damaged channel information so as to cause the damaged channel to have the latest scanning order; and
scanning the plurality of channels according to the adjusted scanning sequence to determine, among the plurality of channels, a channel for performing communication between the cable modem and the CMTS.

16. The non-transitory computer readable medium according to claim 15, wherein the damaged channel information indicates a plurality of damaged channels detected during the operation phase,
the instructions, when executed by the processor, further perform at least the following:
during the initialization phase, adjusting the scanning sequence of the plurality of channels according to the stored damaged channel information so as to cause a later detected damaged channel among the plurality of damaged channels to have a later scanning order.

17. The non-transitory computer readable medium according to claim 15, the instructions, when executed by the processor, further perform at least the following:
during the operation phase, acquiring and storing operational channel information indicating an operational channel that is an undamaged channel among the plurality of channels which is detected during the operation phase;
during the initialization phase, adjusting a scanning sequence of the plurality of channels according to the stored operational channel information so as to cause the operational channel to have the earliest scanning order.

18. The non-transitory computer readable medium according to claim 17, wherein the operational channel information indicates a plurality of operational channels detected during the operation phase,
the instructions, when executed by the processor, further perform at least the following:
during the initialization phase, adjusting the scanning sequence of the plurality of channels according to the stored operational channel information so as to cause a later detected operational channel among the plurality of operational channels to have an earlier scanning order.

19. The non-transitory computer readable medium according to claim 17, the instructions, when executed by the processor, further perform at least the following:
during the operation phase, updating at least one of the stored damaged channel information and operational channel information,
wherein the updating includes at least one of:
in a case that a first damaged channel detected during the operation phase does not match any damaged channel indicated by the stored damaged channel information, adding information indicating the first damaged channel to the damaged channel information;
in a case that a first operational channel detected during the operation phase does not match any operational channel indicated by the stored operational channel information, adding information indicating the first operational channel to the operational channel information;
in a case that a second operational channel detected during the operation phase matches a second damaged channel indicated by the stored damaged channel information, removing information indicating the second damaged channel from the stored damaged channel information;

in a case that a third damaged channel detected during the operation phase matches a third operational channel indicated by the stored operational channel information, removing information indicating the third operational channel from the stored operational channel information.

* * * * *